United States Patent
Wei et al.

(10) Patent No.: US 10,298,333 B2
(45) Date of Patent: May 21, 2019

(54) METHOD OF DIMMING FOR VISIBLE LIGHT COMMUNICATIONS

(71) Applicant: Futurewei Technologies, Inc., Plano, TX (US)

(72) Inventors: Dong Wei, Austin, TX (US); Shun Lou, Hefei (CN); Chen Gong, Hefei (CN); Nan Wu, Hefei (CN); Zhengyuan Xu, Hefei (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/691,915

(22) Filed: Aug. 31, 2017

(65) Prior Publication Data
US 2018/0069628 A1 Mar. 8, 2018

Related U.S. Application Data
(60) Provisional application No. 62/383,300, filed on Sep. 2, 2016.

(51) Int. Cl.
*H05B 37/02* (2006.01)
*H04B 10/116* (2013.01)
*H04B 10/524* (2013.01)

(52) U.S. Cl.
CPC ......... *H04B 10/524* (2013.01); *H04B 10/116* (2013.01); *H05B 37/0272* (2013.01)

(58) Field of Classification Search
CPC ..... H04B 10/11–10/116; H04B 10/524; H05B 37/0272
See application file for complete search history.

(56) References Cited

U.S. PATENT DOCUMENTS

2008/0285983 A1* 11/2008 Gnauck ............ H04B 10/2513
398/189
2010/0284690 A1 11/2010 Rajagopal et al.
(Continued)

FOREIGN PATENT DOCUMENTS

CN 102461017 A 5/2012
CN 104158632 A 11/2014
(Continued)

OTHER PUBLICATIONS

Machine Translation and Abstract of Chinese Publication No. CN104158632, Nov. 19, 2014, 17 pages.
(Continued)

*Primary Examiner* — Casey L Kretzer
(74) *Attorney, Agent, or Firm* — Conley Rose, P.C.

(57) ABSTRACT

A method implemented by a visible light communication (VLC) device comprises determining, by a processor of the VLC device, n time slots for a signal block based on a dimming value, the signal block specifying a predetermined duration of time and the signal block being divided equally into n time slots, with the dimming value specifying a light intensity of light to be emitted by the light source, determining, by the processor, w pulses to be transmitted during one or more of the n time slots of the signal block, based on the dimming value and according to a pulse pattern indicating a position of the w pulses transmitted during the one or more of the n time slots, and determining, by the processor, a codeword based on n and w, the codeword corresponding to the pulse pattern.

20 Claims, 10 Drawing Sheets

(56) References Cited

U.S. PATENT DOCUMENTS

| | | | |
|---|---|---|---|
| 2013/0126713 A1* | 5/2013 | Haas | H04B 10/116 250/208.2 |
| 2013/0308954 A1* | 11/2013 | Lee | H03M 13/005 398/118 |
| 2015/0147069 A1 | 5/2015 | Brandt-Pearce et al. | |

FOREIGN PATENT DOCUMENTS

| | | |
|---|---|---|
| CN | 104753595 A | 7/2015 |
| CN | 105119655 A | 12/2015 |

OTHER PUBLICATIONS

Machine Translation and Abstract of Chinese Publication No. CN104753595, Jul. 1, 2015, 13 pages.

Machine Translation and Abstract of Chinese Publication No. CN105119655, Dec. 2, 2015, 18 pages.

Foreign Communication From A Counterpart Application, PCT Application No. PCT/CN2017/100283, International Search Report dated Oct. 27, 2017, 7 pages.

Foreign Communication From A Counterpart Application, PCT Application No. PCT/CN2017/100283, Written Opinion dated Oct. 27, 2017, 4 pages.

Short Range Wireless Optical Communication Using Visible Light, Institute of Electrical and Electronics Engineers (IEEE) 802.15.7, 2011.

H. Sugiyama and K. Nosu, "MPPM: A method for improving the band-utilization efficiency in optical PPM," Journal of Lightwave Technology, vol. 7, No. 3, Mar. 1989, pp. 465-472.

"G.vlc: Multi-pulse Pulse Position Modulation with Dimming Support," Study Group 15—Contribution 2076, COMM 15-C 2076-E, Questions 18/15; International Telecommunication Union Telecommunication Standardization Sector, Sep. 2016, 4 pages.

Garber, "Turning on the Lights for Wireless Communications," Technology News, IEEE Computer Society, Nov. 2011, pp. 11-14.

* cited by examiner

| w \ n | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 0.5000 | 0 | 0 | 0 | 0 | 0 | 0 | 0 | 0 | 0 | 0 |
| 3 | 0.3333 | 0.3333 | 0 | 0 | 0 | 0 | 0 | 0 | 0 | 0 | 0 |
| 4 | 0.5000 | 0.5000 | 0.5000 | 0 | 0 | 0 | 0 | 0 | 0 | 0 | 0 |
| 5 | 0.4000 | 0.6000 | 0.6000 | 0.4000 | 0 | 0 | 0 | 0 | 0 | 0 | 0 |
| 6 | 0.3333 | 0.5000 | 0.6667 | 0.5000 | 0.3333 | 0 | 0 | 0 | 0 | 0 | 0 |
| 7 | 0.2857 | 0.5714 | 0.7143 | 0.7143 | 0.5714 | 0.2857 | 0 | 0 | 0 | 0 | 0 |
| 8 | 0.3750 | 0.5000 | 0.6250 | 0.7500 | 0.6250 | 0.5000 | 0.3750 | 0 | 0 | 0 | 0 |
| 9 | 0.3333 | 0.5556 | 0.6667 | 0.6667 | 0.6667 | 0.6667 | 0.5556 | 0.3333 | 0 | 0 | 0 |
| 10 | 0.3000 | 0.5000 | 0.6000 | 0.7000 | 0.7000 | 0.7000 | 0.6000 | 0.5000 | 0.3000 | 0 | 0 |
| 11 | 0.2727 | 0.4545 | 0.6364 | 0.7273 | 0.7273 | 0.7273 | 0.7273 | 0.6364 | 0.4545 | 0.2727 | 0 |
| 12 | 0.2500 | 0.5000 | 0.5833 | 0.6667 | 0.6667 | 0.6667 | 0.6667 | 0.6667 | 0.5833 | 0.5000 | 0.2500 |

Table 1

FIG. 5

| w\n | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 0.5000 | 0 | 0 | 0 | 0 | 0 | 0 | 0 | 0 | 0 | 0 |
| 3 | 0.3333 | 0.6667 | 0 | 0 | 0 | 0 | 0 | 0 | 0 | 0 | 0 |
| 4 | 0.2500 | 0.5000 | 0.7500 | 0 | 0 | 0 | 0 | 0 | 0 | 0 | 0 |
| 5 | 0.2000 | 0.4000 | 0.6000 | 0.8000 | 0 | 0 | 0 | 0 | 0 | 0 | 0 |
| 6 | 0.1667 | 0.3333 | 0.5000 | 0.6667 | 0.8333 | 0 | 0 | 0 | 0 | 0 | 0 |
| 7 | 0.1429 | 0.2857 | 0.4286 | 0.5714 | 0.7143 | 0.8571 | 0 | 0 | 0 | 0 | 0 |
| 8 | 0.1250 | 0.2500 | 0.3750 | 0.5000 | 0.6250 | 0.7500 | 0.8750 | 0 | 0 | 0 | 0 |
| 9 | 0.1111 | 0.2222 | 0.3333 | 0.4444 | 0.5556 | 0.6667 | 0.7778 | 0.8889 | 0 | 0 | 0 |
| 10 | 0.1000 | 0.2000 | 0.3000 | 0.4000 | 0.5000 | 0.6000 | 0.7000 | 0.8000 | 0.9000 | 0 | 0 |
| 11 | 0.0909 | 0.1818 | 0.2727 | 0.3636 | 0.4545 | 0.5455 | 0.6364 | 0.7273 | 0.8182 | 0.9091 | 0 |
| 12 | 0.0833 | 0.1667 | 0.2500 | 0.3333 | 0.4167 | 0.5000 | 0.5833 | 0.6667 | 0.7500 | 0.8333 | 0.9167 |

Table 2

FIG. 6

METHOD OF DIMMING FOR VISIBLE LIGHT COMMUNICATIONS

CROSS-REFERENCE TO RELATED APPLICATIONS

The present application claims benefit of U.S. Provisional Patent Application No. 62/383,300 filed Sep. 2, 2016, by Futurewei Technologies, Inc., entitled "Method of Dimming for Visible Light Communications," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Recent advancements in solid-state lighting have enabled light sources to switch to different light intensity levels at a rate which is fast enough to be imperceptible by a human eye. The light sources may be any light diode capable of emitting different intensities of light over time, such as LEDs, fluorescent lights, or incandescent lights. This functionality can be used for illumination, aesthetic value, and visible light communications (VLC) where the data is encoded in the emitting light in various ways. VLC is a data communications method that involves modulating a light intensity of light emitted by a light source. Dimming control mechanisms control the light intensity of the light emitted by the light source. In VLC, a light source is configured to produce a signal comprising modulated data in the form of light emitted by the light source. The signal includes one or more signal blocks defining a predetermined period of time during which the data is modulated.

VLC is substantially immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures.

SUMMARY

In an embodiment, the disclosure includes a method implemented by a VLC device, comprising determining, by a processor of the VLC device, n time slots for a signal block based on a dimming value, the signal block specifying a predetermined duration of time and the signal block being divided equally into n time slots, with the dimming value specifying a light intensity of light to be emitted by a light source, determining, by the processor, w pulses to be transmitted during one or more of the n time slots of the signal block based on the dimming value and according to a pulse pattern indicating a position of the w pulses transmitted during the one or more of the n time slots, determining, by the processor, a codeword based on n and w, the codeword corresponding to the pulse pattern. In some embodiments, the disclosure includes further comprising determining, by the processor, n and w based on a normalized transmission rate of the signal block with n time slots and w pulses. In some embodiments, the disclosure further includes determining, by the processor, a plurality of codewords for the dimming value based on n and w, wherein the plurality of codewords are determined in a manner to maximize a minimum Hamming distance between each pair of the plurality of codewords in the codebook, and wherein the plurality of codewords are determined to minimize a number of pairs of the plurality of codewords having the minimum Hamming distance. In some embodiments, the disclosure further includes wherein the dimming value substantially corresponds to w/n, and/or wherein the dimming value is between (w−1)/n and w/n. In some embodiments, the disclosure further includes determining a first plurality of codewords and a second plurality of codewords for the dimming value, wherein the first plurality of codewords is based on n and w, and the second plurality of codewords being based on n and w−1. In some embodiments, the disclosure further includes wherein a first quantity (a) of the first plurality of codewords is output to the light source, wherein a second quantity (b) of the second plurality of codewords is output to the light source, and wherein the light intensity of the light source is modulated differently according to the first plurality of codewords and the second plurality of codewords to convey information. In some embodiments, the intensity of the light is modulated according to the codeword to convey information using multi-pulse pulse-position modulation (MPPM).

In an embodiment, the disclosure includes a VLC device, comprising a memory storage comprising instructions, and a processor in communication with the memory, wherein the processor executes the instructions to determine n time slots for a signal block based on a dimming value, the signal block specifying a predetermined duration of time and the signal block being divided equally into n time slots, with the dimming value specifying a light intensity of light to be emitted by a light source, determine w pulses to be transmitted during one or more of the n time slots of the signal block based on the dimming value and according to a pulse pattern indicating a position of the w pulses transmitted during the one or more of the n time slots, and determine a codeword based on n and w, the codeword corresponding to the pulse pattern. In some embodiments, the disclosure further includes wherein the light intensity of the light is modulated according to the codeword to convey information using multi-pulse pulse-position modulation (MPPM). In some embodiments, the disclosure further includes wherein n and w are determined based on a normalized transmission rate of the signal block with n time slots and w pulses. In some embodiments, the disclosure further includes wherein the processor is further configured to obtain the dimming level from a user interface or an external device. In some embodiments, the disclosure further includes wherein the processor is further configured to determine a plurality of codewords for the dimming value based on n and w, wherein the plurality of codewords are determined in a manner to maximize a minimum Hamming distance between each pair of the plurality of codewords in the codebook, and wherein the plurality of codewords are determined to minimize a number of pairs of the plurality of codewords having the minimum Hamming distance.

In an embodiment, the disclosure includes a non-transitory computer-readable storage medium having computer-executable instructions that, when executed by a processor, cause an apparatus to determine n time slots for a signal block based on a dimming value, the signal block specifying a predetermined duration of time, the signal block being divided equally into n time slots, with the dimming value specifying a light intensity of light to be emitted by a light source, determine w pulses to be transmitted during one or more of the n time slots of the signal block, based on the dimming value and according to a pulse pattern indicating a position of the w pulses transmitted during one or more of the n time slots, and determine a codeword based on n and w, the codeword corresponding to the pulse pattern. In some embodiments, the computer-executable instructions, when executed by the processor, further cause the apparatus to determine n and w based on a normalized transmission rate of the signal block with n time slots and w pulses. In some embodiments, the computer-executable instructions, when executed by the processor, further cause the apparatus to determine a plurality of codewords for the dimming value based on n and w, wherein the plurality of codewords are determined to maximize a minimum Hamming distance between each pair of the plurality of codewords in the codebook, and wherein the plurality of codewords are determined in a manner to minimize a number of pairs of the plurality of codewords having the minimum Hamming distance. In some embodiments, the disclosure further includes wherein the dimming value substantially corresponds to w/n, and/or wherein the dimming value is between (w−1)/n and w/n. In some embodiments, the computer-executable instructions, when executed by the processor, further cause the apparatus to obtain the dimming level from a user interface or an external device. In some embodiments, the disclosure further includes wherein the light intensity of the light source is modulated according to the codeword to convey information using MPPM.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 shows Table 1, which defines the normalized transmission rate as a function of n and w, where n is the number of time slots in a signal block and w is the number of pulses transmitted during the signal block.

FIG. 6 shows Table 2, which defines dimming values as a function of n and w.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Overview of Subject Matter

A VLC system may include several hardware components, such as a VLC device that controls the light intensity of light emitted by a light source. The light intensity may be controlled using various modulation schemes that involve transmitting a pulse, or power, to a load of the light source for predetermined periods of time. However, traditional modulation schemes do not generate light at a desired light intensity while maximizing the amount of data that can be transmitted using the light. The optimized modulation schemes of controlling light intensity as disclosed herein involve determining codewords with n time slots and w pulses that are transmitted during one or more of the n time slots. The n time slots and w pulses may be determined based on a dimming value and a normalized transmission rate of a signal block having n time slots and w pulses. Therefore, when the light source is dimmed to a reduced light intensity, the optimized modulation schemes disclosed herein maximize data transmission while maintaining light intensity according to the dimming value.

Figure 1:
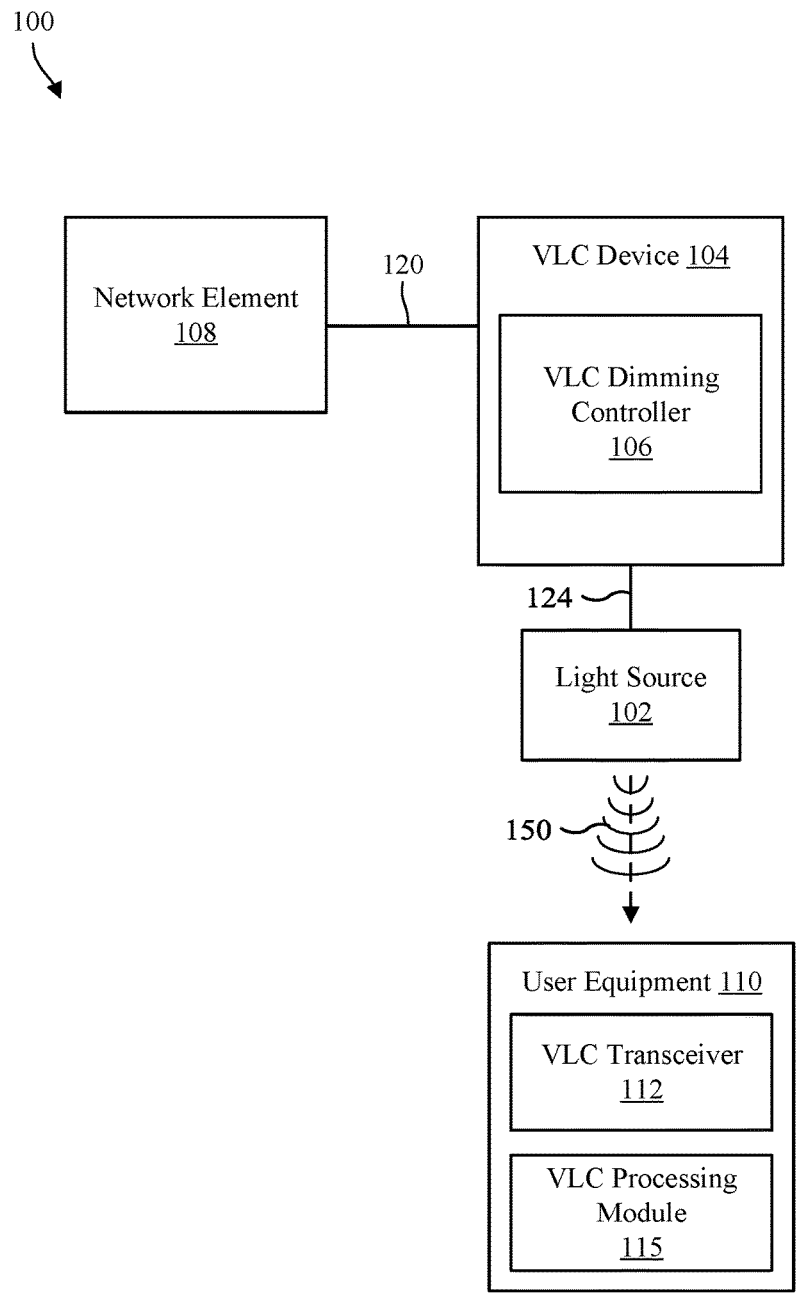
FIG. 1 is a drawing of an example VLC system.
Figure 2:
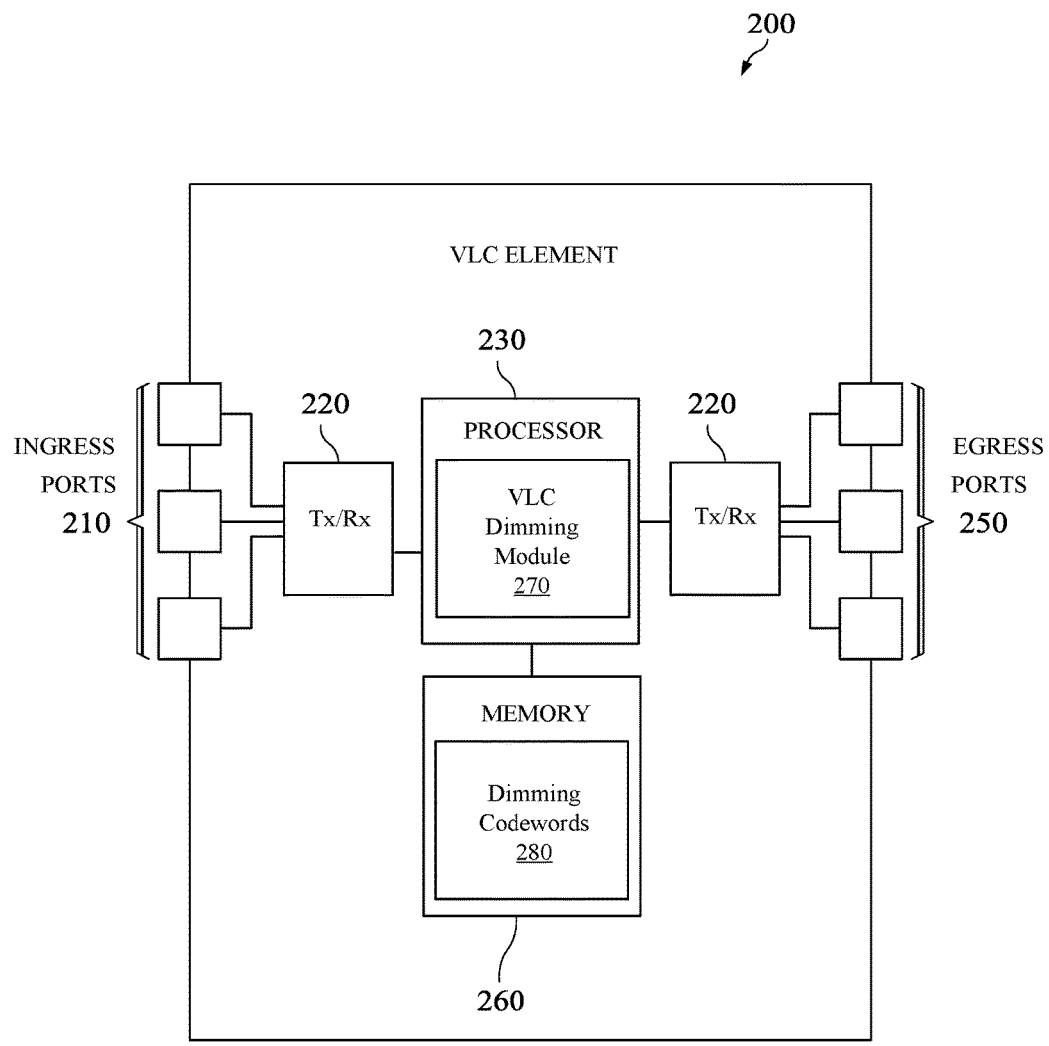
FIG. 2 is a schematic diagram of a VLC element.

FIGS. 1 and 2—Hardware Components

FIG. 1 is a drawing of an example VLC system 100. The VLC system 100 includes one or more user equipments (UEs) 110 and one or more light sources 102. The VLC system 100 may overlap with one or more other communications systems, such as for example, a wireless wide area network (WWAN) supported by a network element 108. The light source 102 may be coupled to a VLC device 104, which is coupled to the network element 108. The VLC device 104 may comprise a VLC dimming controller 106. In some embodiments, the VLC dimming controller 106 may be configured to control the light intensity of light 150 emitted by the light source 102 according to obtained dimming values.

In an embodiment, the VLC device 104 may receive data from the network element 108 over link 120. In one embodiment, the VLC dimming controller 106 may obtain a dimming value from the network element 108. In another embodiment, the VLC dimming controller 106 may obtain a dimming value from an input received by an operator of the VLC device 104. In an embodiment, a dimming value is a value between 0 and 1 that corresponds to an intensity of light 150 to be transmitted by the light source 102 during one or more of the signal blocks. In an embodiment, a signal block specifies a predefined duration of time used for VLC. In an embodiment, the signal block is divided equally into a quantity of n time slots, in which a quantity of w pulses are transmitted during one or more of the n time slots of the signal block to achieve the obtained dimming value.

For example, the dimming value may be a value of luminous intensity that is to be output during a time slot of a signal block. Luminous intensity may be a measure of the wavelength-weighted power emitted by a light source 102 in a particular direction per unit solid angle, based on a luminosity function, which is a standardized model of the sensitivity of the human eye. For example, if an operator of the VLC system 100 desires to output 50 percent (%) of the light intensity that light source 102 is capable of outputting, the dimming value for 50% of the light intensity of light source 102 may be 0.500. Similarly, if an operator of the VLC system 100 desires to output 87.6% of the light intensity that light source 102 is capable of outputting, the dimming value for 87.6% of the light intensity of light source 102 may be 0.876.

Based on the obtained dimming value, the VLC dimming controller 106 may generate a signal corresponding to the dimming value and send the signal via link 124 to the light source 102 for communication using VLC. In an embodiment, the VLC device 104 may generate the signal having a one or more signals blocks with n time slots and w pulses in each signal block based on the methods of dimming control disclosed herein. In an embodiment in which the light source 102 is a direct current (DC) powered device, the signal may be communicated via a DC category (CAT) cable from the VLC device 104 to the light source 102. In an embodiment where the light source 102 is an alternating current (AC) powered device, the light source 102 may have an external dimming pin, the function of which is to receive a dimming signal over link 124. In an embodiment, the signal sent via link 124 feeds into the dimming pin of the light source 102.

Although FIG. 1 depicts the VLC device 104, the network element 108, and the light source 102 as separate modules, one of ordinary skill in the art would appreciate that any combination of these modules may be coupled and/or housed within a single device. For example, the VLC device 104 may be a standalone unit that generates the signal to be transmitted over link 124. In another example, the VLC device 104 may be connected, via a wireline or a wireless link 120, to the network element 108 and/or a device from which the VLC device 104 receives data to be communicated. In an embodiment, the network element 108 and/or the VLC device 104 may be connected to the Internet, an intranet, a Local Area Network (LAN), a backbone network, etc. In another example, the VLC device 104 and the VLC dimming controller 106 may be separate devices. In another example, the VLC device 104 and the VLC dimming controller 106 may be co-located within the light source 102. In such an embodiment, the VLC device 104 may have a power-line communication (PLC) interface to an external network (e.g., the network element 108) from which it may receive messages. In an embodiment, the VLC device 104 may be a standalone device, not connected to the network element 108, and may internally include, in a memory, the data to be communicated through the light source 102.

The UE 110 may be a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. UE 110 may include a VLC transceiver 112 and a VLC processing module 115. In an embodiment, the VLC transceiver 112 may include a receiver, such as but not limited to, a Complimentary Metal-Oxide Semiconductor (CMOS) imaging sensor camera which implements a rolling shutter, a photodetector (also referred as a light sensor or a photodiode) or an image sensor (a matrix of photodiodes), configured to receive the modulated signals in the form of emitted light 150 and decode the data. In an operational aspect, the UE 110 may receive light 150 at different light intensities from the light source 102. The VLC transceiver 112 receives the light 150 at different light intensities, and the VLC processing module 115 may determine signal blocks in the light received. The signal blocks may be determined to each have n time slots with w pulses transmitted during one or more of the n time slots. In some embodiments, the VLC processing module 115 determines a dimming value and one or more codewords in each of the signal blocks based on n and w. Further, once the dimming value in the received signal is determined, the VLC processing module 115 may identify and process data modulated on each of the signal blocks. In an operational aspect, the UE 110 receiver may detect a pulse pattern in each of the signal blocks by correlating the different light intensities received in light 150 with stored codebooks, as will be further described in FIG. 4. A codebook comprises a plurality of codewords for various different combinations of n time slots and w pulses that are recognizable by UE 110 and the VLC device 104. Further, as the UE 110 may not know the dimming value, the VLC processing module 115 may correlate the received signal with several codewords in the codebook stored at the UE 110.

Communications between the VLC device 104 and the network element 108 may be supported via wireline and/or wireless link 120. In an embodiment, the wireline connection may be based on a PLC, Ethernet, etc. In another embodiment, the wireless connection may use a wireless peer-to-peer communication system. In another embodiment, the wireless connection may be use cellular communication systems such as but not limited to, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, Long Term Evolution (LTE) systems, and/or fifth generation (5G) wireless systems.

FIG. 2 is a schematic diagram of a VLC element 200. The VLC element 200 is suitable for implementing the VLC device 104, network element 108, UE 110, or any other disclosed embodiments, including a device or system for implementing methods 700, 800, and 900. The VLC element 200 comprises ingress ports 210, a transceiver (Tx/Rx) unit 220 coupled to the ingress ports 210 and configured for receiving data; a processor, logic unit, or central processing unit (CPU) 230 coupled to the Tx/Rx unit(s) 220 and configured to process the data; a Tx/Rx unit 220 coupled to the egress ports 250 and configured for transmitting the data; and a memory 260 coupled to the processor 230 and configured for storing the data. The VLC element 200 may also comprise optical-to-electrical (OE) components and electrical-to-optical (EO) components coupled to the ingress ports 210, Tx/Rx units 220, and egress ports 250 for egress or ingress of optical or electrical signals.

The processor 230 may be implemented by hardware and software in some embodiments. The processor 230 may be implemented as one or more CPU chips, cores (e.g., as a multi-core processor), field-programmable gate arrays (FPGAs), application specific integrated circuits (ASICs), or digital signal processors (DSPs). The processor 230 is in communication with the ingress ports 210, Tx/Rx units 220, egress ports 250, and memory 260. The memory 260 comprises one or more disks, tape drives, and/or solid-state drives and may be used as an over-flow data storage device, to store programs when such programs are selected for execution, and/or to store instructions and data that are read during program execution. The memory 260 may be volatile or non-volatile and may be read-only memory (ROM), random-access memory (RAM), ternary content-addressable memory (TCAM), or static random-access memory (SRAM).

In some embodiments, the VLC element 200 may be implemented as the VLC device 104. The Tx/Rx units 220 may be configured to transmit the signal comprising the signal blocks to the light source 102 of FIG. 1. The signal may comprise the signal blocks that are split into n time slots in which w pulses are transmitted in at least two of the n time slots. The signal instructs the light source to output a dimming level according to the n time slots and the w pulses.

In some embodiments, the VLC dimming controller 106 comprises the processor 230 that executes the VLC dimming module 270. The VLC dimming module 270 performs at least part of the methods 700, 800, and 900. The inclusion of the VLC dimming module 270 therefore provides an improvement to the functionality of the VLC element 200. The VLC dimming module 270 also effects a transformation of the VLC element 200 to a different state. Alternatively, the VLC dimming module 270 is implemented as instructions stored in the memory 260 and executed by the processor 230.

In some embodiments, the VLC dimming controller 106 comprises the memory 260 configured to store dimming codewords 280. Dimming codewords 280 may be a database storing codewords for a plurality of different pairs of n time slots and w pulses that are transmitted in a signal block. In an embodiment, dimming codewords 280 is a database storing a codebook, or a plurality of different codewords, for a pair of n time slots and w pulses. For example, the memory 260 may store one or more codebooks for a determined n and w, based on an obtained dimming value. The memory 260 may store a first codebook based on n and w. The memory 260 may also store a second codebook based on n and w−1.

Figure 3A:
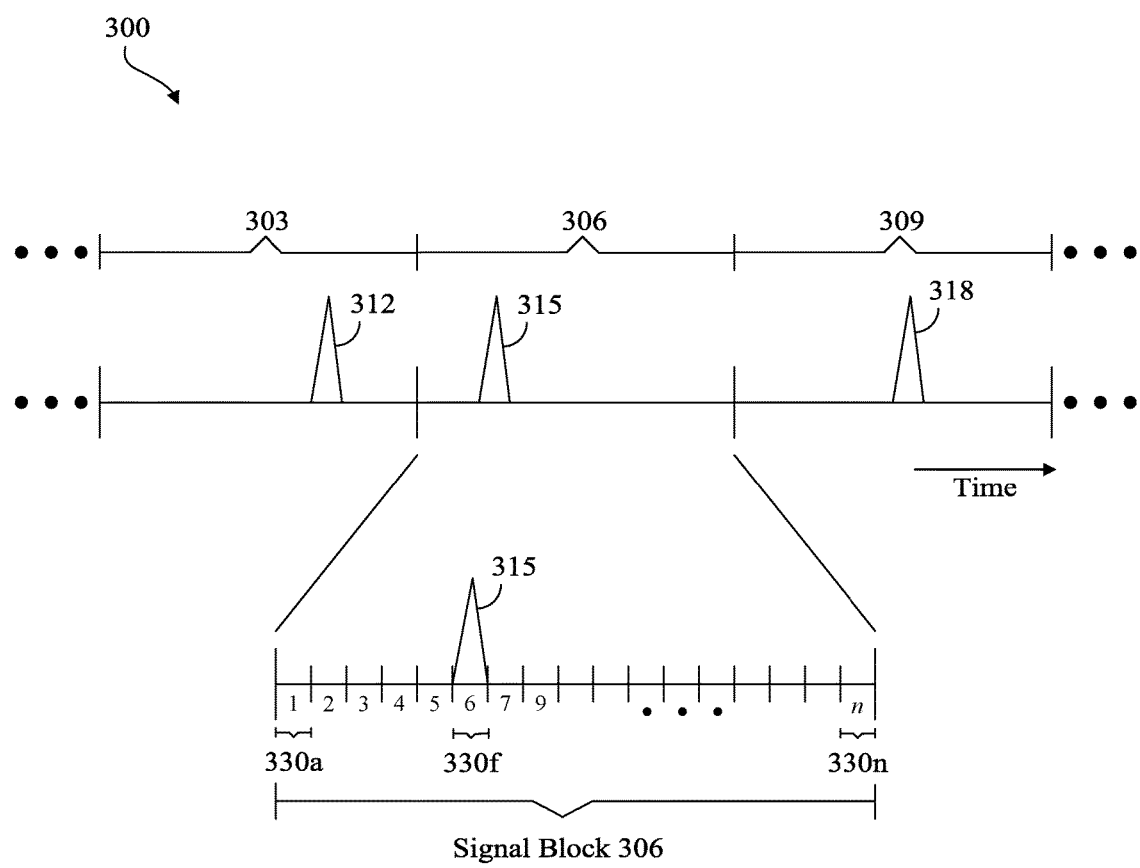
FIGS. 3A and 3B are schematics of signal block segmenting and pulsing characteristics according to various optical modulation schemes.
Figure 3B:
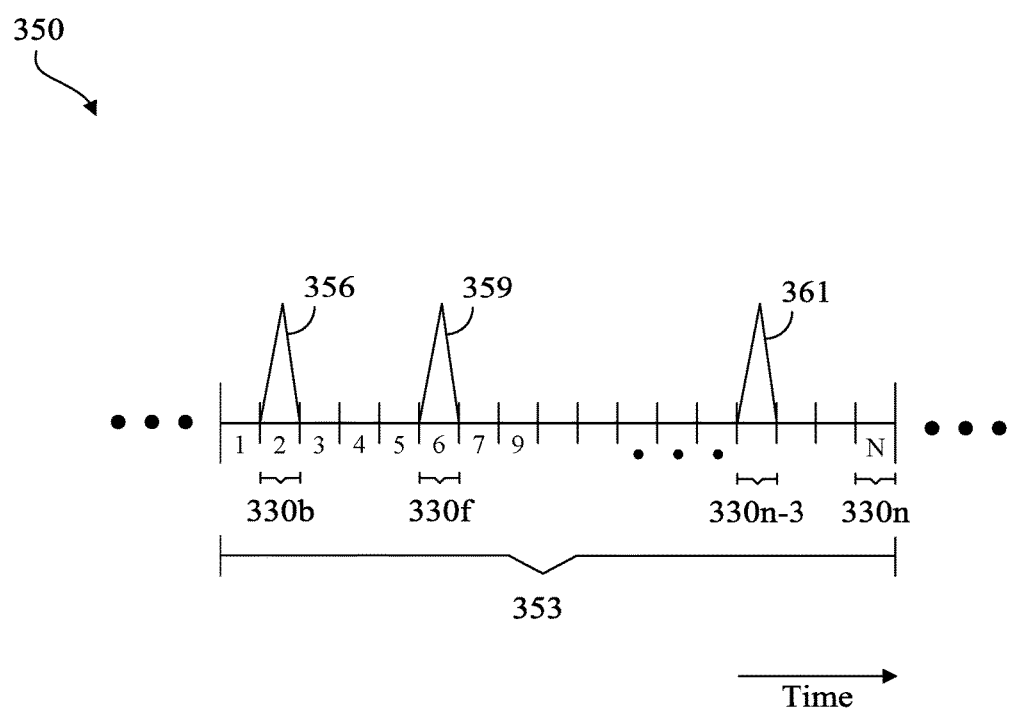

FIGS. 3A and 3B—Modulation Schemes

The VLC device 104 may be configured to modulate data onto the light 150 emitted by the light source 102. Traditional methods of optical modulation control an intensity of light 150 output by the light source 102 by controlling a pulse width of a pulse transmitted during a signal block and/or controlling a duty cycle of the pulses transmitted in a signal block. Pulse width modulation (PWM) is a technique that controls a width of a pulse applied to a light source (or a length of time that power is supplied to a light source) to control a light intensity of light emitted by the source. A pulse width is a portion of a time period (or duty cycle) for which the pulse amplitude is positive or non-zero. The greater the pulse width (i.e, where the pulse takes up more and more of the duty cycle), the brighter the light intensity.

FIGS. 3A and 3B are schematics of signal block segmenting and pulsing characteristics according to various optical modulation schemes. FIG. 3A is a schematic 300 illustrating pulses transmitted during signal blocks according to pulse-position modulation (PPM). The PPM schematic 300 shows how PPM is used to digitally transmit information. In PPM, the information to be sent is represented by the position of the pulse in each signal block (or duty cycle). The time used for communication is divided into equal consecutive signal blocks 303, 306, and 309. A signal block specifies a predetermined duration of time and is divided equally into n time slots. As shown in FIG. 3A, signal block 306 is divided into n time slots 330a-n.

In PPM, one pulse is transmitted during one of the n time slots in each signal block on a transmitting side. As shown in FIG. 3A, pulse 312 is the only pulse that is transmitted during signal block 303, pulse 315 is the only pulse transmitted during signal block 306, and pulse 318 is the only pulse transmitted during signal block 309. The position of the pulse 315 for the signal block 306 is the sixth time slot 330f. Therefore, $\log_2 n$ bits of information are transmitted during every signal block. PPM only permits one pulse to be transmitted during a signal block, which is an inefficient method of digital communication. As a result, transmission capacity when using PPM is restricted by the low band-utilization efficiency.

MPPM improves the band-utilization efficiency of PPM by reducing the bandwidth used in communication channels of a VLC network to about half that of the PPM at the same transmission efficiency. MPPM allows for two or more pulses to be transmitted during a signal block. Therefore, MPPM can achieve a significantly higher spectral efficiency when compared to PPM. FIG. 3B is a schematic 350 illustrating pulses transmitted during signal blocks according to MPPM. As shown in FIG. 3B, three separate pulses, pulse 356, pulse 359, and pulse 361 are sent at different time slots 330b, 330f, and 330n-3 of the signal block 353, respectively. The signal block 353 is split into n time slots, and w pulses are sent during one or more of the n time slots. MPPM transmits $\log_2$ $$\binom{n}{w}$$

bits of information per signal block, while in contrast PPM transmits $\log_2 n$ bits of information per signal block. In MPPM, since multiple pulses are contained in each signal block, the amount of information carried increases in proportion to the number of pulses. MPPM reduces the bandwidth used in communication channels of a VLC network compared to PPM, and considerably improves the band-utilization efficiency compared to PPM.

Variable PPM (VPPM) is a hybrid of PPM and PWM in that the pulse widths of multiple pulses in a time slot are modified to control light intensity. VPPM is described in Institute of Electrical and Electronics Engineers (IEEE) 802.15.7, entitled "Short Range Wireless Optical Communication Using Visible Light," 2011, which is hereby incorporated by reference in its entirety. Similar to MPPM, in VPPM the bits are encoded by transmitting a pulse in a time slot of a signal block. However, unlike MPPM, in VPPM the width of the pulse can also be modified as needed. For example, if the desired dimming value is 0.2, then the pulse width should be 20% of the total signal block. VPPM achieves a more granulated control of the dimming value of a light source by alternating different pulse widths across different signal blocks to result in a more specific light intensity of light 150 emitted by the light source 102 over a period of time. For example, alternating transmissions of signal blocks with a 40% pulse width and 50% pulse width over the course of several hundreds or thousands of signal blocks will result in an average of a 45% pulse width. The 45% average pulse width may be a more fine-grained light intensity or dimming value than just using a 40% pulse width or a 50% pulse width alone. The VPPM method of optical modulation control controls a pulse width of a pulse in a signal block and/or controlling a duty cycle of the pulses in a signal block. However, the VPPM method of dimming control has a low spectral efficiency and thus, may not efficiently generate light at a desired dimming level to maximize the amount of data that can be transmitted on a signal block.

To overcome the limitations associated with PPM, MPPM, and VPPM modulation schemes, disclosed herein are embodiments directed to an optimized way of controlling a light intensity of light emitted by a light source 102. Instead of varying the pulse width to control a light intensity of light emitted by a light source 102, embodiments of the disclosure are directed to varying the quantity of time slots (n) in a signal block and/or varying the quantity of pulses (w) sent during a signal block to control the light intensity. In some embodiments, the disclosure includes a VLC device configured to determine n time slots for a signal block based on a dimming value. The signal block specifies a predetermined duration of time and is divided equally into n time slots. The dimming value corresponds to an intensity of light to be transmitted during the signal block. In some embodiments, the w pulses to be transmitted during one or more of the n time slots of the signal block is determined based on the dimming value. A pulse occurs when a signal is modulated ON for each of the w pulses sent during one or more of the n time slots.

FIG. 4—Codewords

The dimming control methods of controlling light intensity as disclosed herein involve determining codewords with n time slots and w pulses that are transmitted during one or more of the n time slots. The codeword may be a binary digit sequence corresponding to a pulse pattern for the signal block with n time slots and w pulses. The time slots may also be referred to as chips, and the number of w pulses in a signal block may also be referred to as a code weight. In an embodiment, the VLC device 104 and the UE 110 both store predefined codewords that define pulse patterns within a signal block having n time slots and w pulses in binary digits of 0s and 1s. For example, an operator of the VLC system 100 may manually store the codewords at the VLC device 104 and the UE 110, or the network element 108 may transmit the codewords to the VLC device 104 and the UE 110.

Figure 4:
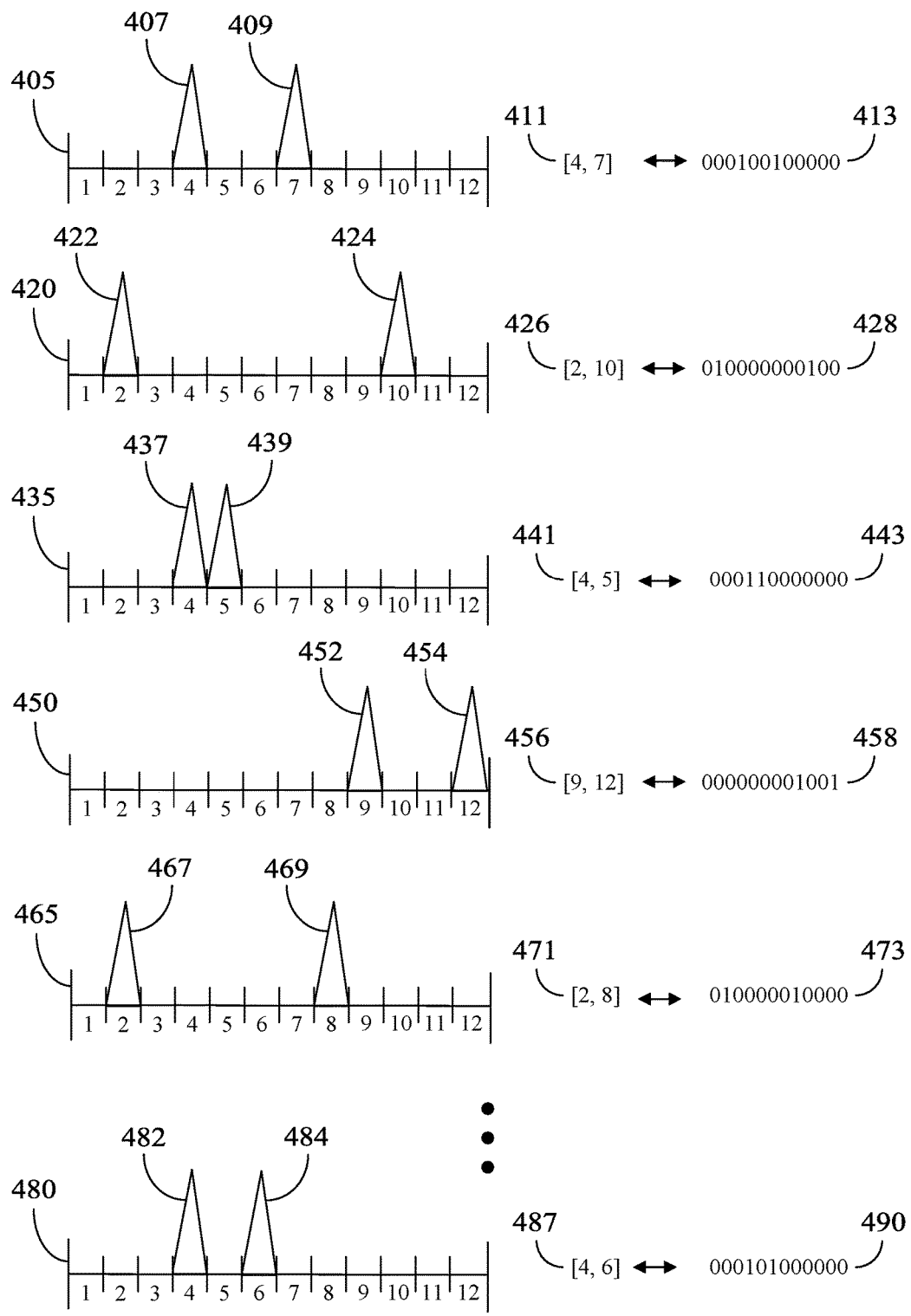
FIG. 4 shows examples of codewords corresponding to pulse patterns.

FIG. 4 shows examples of pulse patterns and assigned codewords for a given pair of n and w. FIG. 4 shows 6 example signal blocks 405, 420, 435, 450, 465, and 480. Each of signal blocks 405, 420, 435, 450, 465, and 480 are split into 12 time slots such that n=12. As shown in FIG. 4, 2 pulses are sent during the 12 time slots in each of signal blocks 405, 420, 435, 450, 465, and 480, such that w=2. When transmitting signal blocks having 12 time slots and 2 pulses transmitted during the 12 time slots (where (n, w)=(12, 2)), 6 bits of information are transmitted per signal block. A maximum number of codewords ($M_{max}$) possible for a pair of (n, w) is given by equation (1):

$$M_{max} = \binom{n}{w} = \frac{n!}{w!(n-w)!} \quad (1)$$

According to equation (1), when (n, w)=(12, 2), $M_{max}$ is 66 codewords, and therefore, 66 different codewords are possible. There are 66 different ways to transmit 2 pulses in 12 time slots, and thus, a corresponding 66 different pulse patterns are available. In an embodiment, only $2^6$ number of codewords, or 64 codewords, may be needed to represent 6 bits of information. Each codeword corresponds to a pulse pattern of the signal block. Before the transmission of information, the assignation of 64 codewords is fixed, or predetermined, such that the transmitter and receiver can translate the information accurately.

Various examples of the 64 codewords assigned for (n, w)=(12, 2) before the transmission of information is shown in FIG. 4. As shown in the first signal block 405, when a pulse is sent on the fourth time slot 407 and the seventh time slot 409, the pulse pattern 411 is represented as [4, 7]. This pulse pattern 411, represented as [4, 7], corresponds to the codeword 413, represented as 000100100000. In this way, the first signal block 405 shows one codeword 000100100000 for signal blocks having 12 time slots and 2 pulses transmitted at the fourth and seventh time slots during the 12 time slots.

Signal blocks 420, 435, 450, 465, and 480 are different codewords for signal blocks having 12 time slots and 2 pulses transmitted during the 12 time slots. As shown in the second signal block 420, when a pulse is sent on the second time slot 422 and the tenth time slot 424, the pulse pattern 426, represented as [2, 10], corresponds to the codeword 428, represented as 010000000100.

As shown in the third signal block 435, when a pulse is sent on the fourth time slot 437 and the fifth time slot 439, the pulse pattern 441, represented as [4, 5], corresponds to the codeword 443, represented as 000110000000.

As shown in the fourth signal block 450, when a pulse is sent on the ninth time slot 452 and the twelfth time slot 454, the pulse pattern 456, represented as [9, 12], corresponds to the codeword 458, represented as 000000001001.

As shown in the fifth signal block 465, when a pulse is sent on the second time slot 467 and the eight time slot 469, the pulse pattern 471, represented as [2, 8], corresponds to the codeword 473, represented as 010000010000.

As the maximum number of codewords possible for signal blocks when (n, w)=(12, 2) is 66 different codewords, there may be 66 different signal block mappings similar to signal blocks 405, 420, 435, 450, and 465. As shown in the Nth signal block 480, when a pulse is sent on the fourth time slot 482 and the sixth time slot 484, the pulse pattern 487 is represented as [4, 6], corresponds to the codeword 490, represented as 000101000000. The collection of all 66 codewords or different signal block mappings when (n, w)=(12, 2) comprises a codebook. A codebook is a compilation codewords for a pair of n and w. A complete codebook includes all the different codewords possible for a pair of n and w. A codebook may comprise a subset of all the different codewords possible for a pair of n and w.

FIGS. 5 and 6—Dimming Values and Normalized Transmission Rates

In some embodiments, each of the codewords having n time slots and w pulses may be added to a codebook based on a dimming value and a normalized transmission rate of a signal block having the n time slots and w pulses. FIG. 5 shows Table 1, which defines the normalized transmission rate as a function of n and w, where n is number of time slots in a signal block and w is the number of pulses transmitted during a signal block. The rows 506 in Table 1 represent examples of different values of n, and the columns 509 represent examples of different values of w. In Table 1, w<n because there must be at least one fewer pulse transmitted than the number of time slots in a signal block. A normalized transmission rate is how much information can be transmitted by a single pulse during a signal block having n time slots. The normalized transmission rate can be calculated according to equation (2):

$$R_{n,w} = \frac{\left\lfloor \log_2 \binom{n}{w} \right\rfloor}{n} \qquad (2)$$

Table 1 aggregates the values calculated for signal blocks having different pairs of n and w. As shown in Table 1, it can be seen that the highest normalized transmission rate for a given pair of n and w occurs when w is approximately half of n. For example, when n=7, there are six possible w's, and the normalized transmission rate is highest when w=3 and w=4, as shown in box 512. When n=7, the normalized transmission rate is 0.7143, which is higher than the normalized transmission rate for the other w's when n=7. Similarly, when n=8, the normalized transmission rate is highest when n=4, as shown in box 515.

According to some embodiments, the dimming value is determined by equation (3):

$$\text{Dimming value } (D_v) = \frac{w}{n} \qquad (3)$$

where w represents how many time slots are occupied by a pulse for a given signal block with n time slots. For a given n, the VLC dimming controller 106 may be configured to increase w for a higher light intensity, and reduce w for a lower light intensity. For flicker mitigation, the VLC dimming controller 106 may be configured to keep the light intensity constant from one signal block to the next by keeping n and w constant. Embodiments of the present disclosure are directed to changing n and/or w to control dimming while maximizing the normalized transmission rate.

FIG. 6 shows Table 2, which defines the dimming values as a function of n and w, where n is number of time slots in a signal block and w is the number of pulses transmitted during a signal block. The rows 606 represent examples of different values of n, and the columns 609 represent examples of different values of w. Similar to table 1, w<n in Table 2 because there must be at least one fewer pulse transmitted than number of time slots in a signal block. An entry in Table 2 is determined according to w/n for a given n and w. For each pair of n and w, the dimming value corresponds to the light intensity emitted by the light source when the light source transmits signal blocks according to the n and w. As shown in Table 2, the dimming value increases as w increases. For example, the minimum dimming value in Table 2 occurs when n=12, and w=1, as shown in box 612. In contrast, the maximum dimming value occurs when n=12 and w=11, as shown in box 615. The maximum dimming value may correspond to the minimum light intensity. In some embodiments, the dimming value, and therefore light intensity, is directly related to w.

Figure 7:
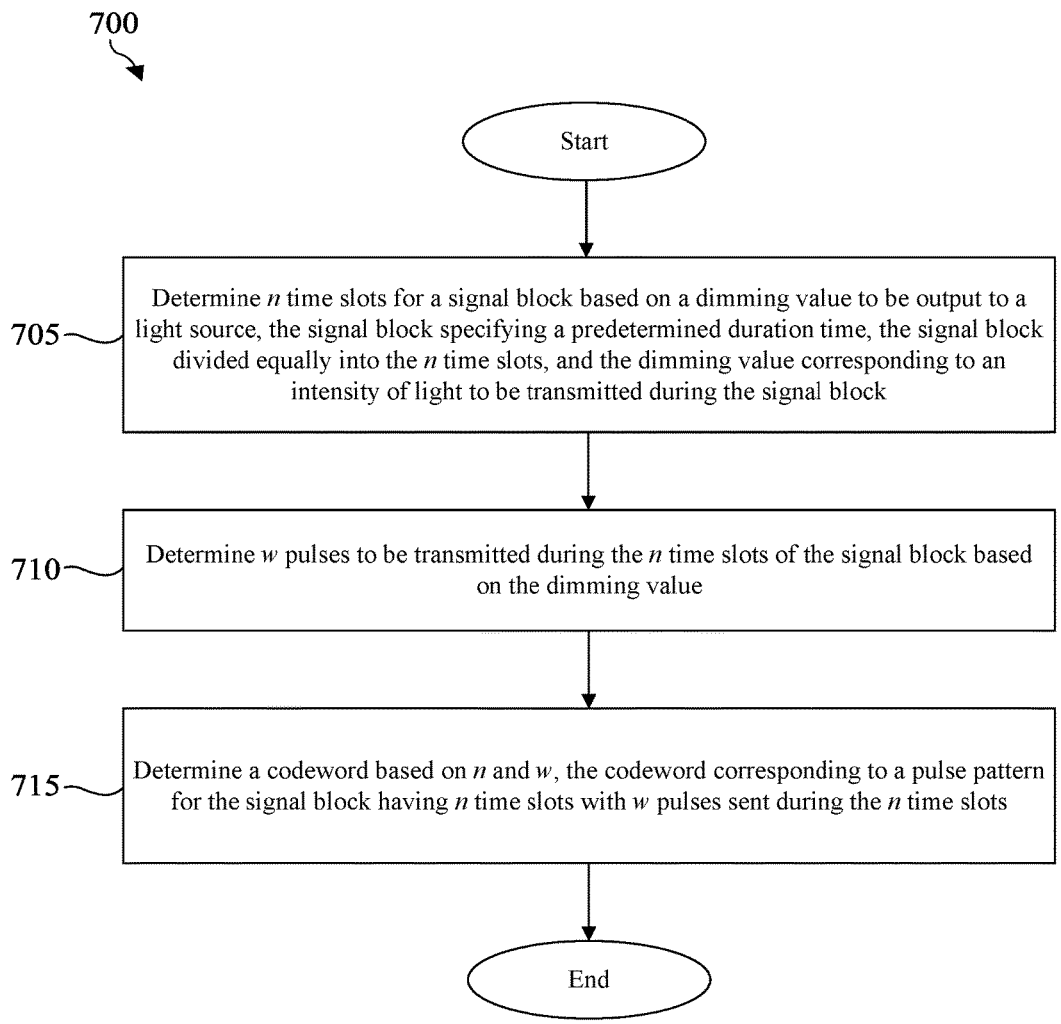
FIG. 7 is a flowchart illustrating a method of dimming control according to an embodiment of the disclosure.
Figure 8:
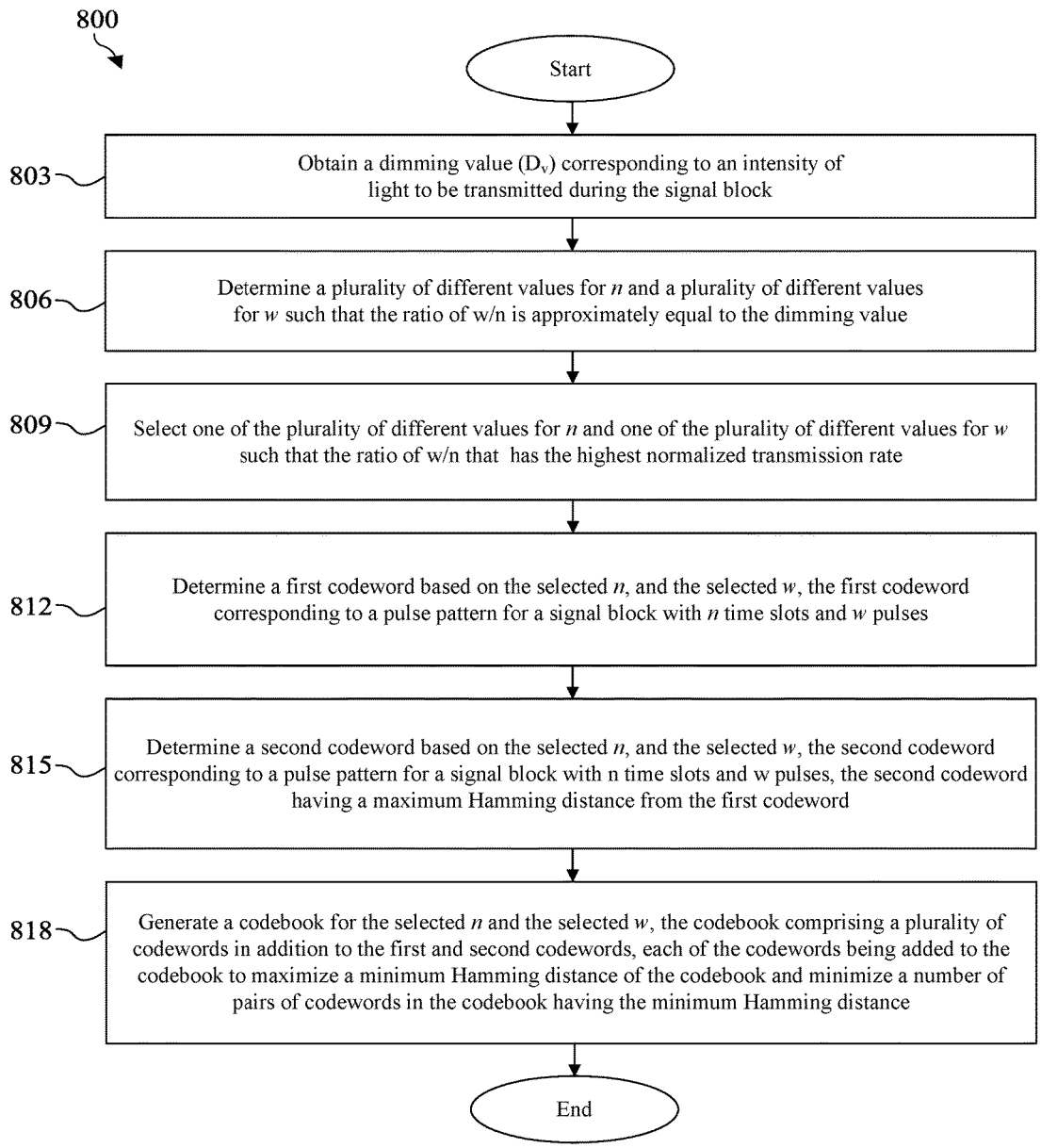
FIG. 8 is a flowchart illustrating a method of a coarse dimming control method according to an embodiment of the disclosure.
Figure 9:
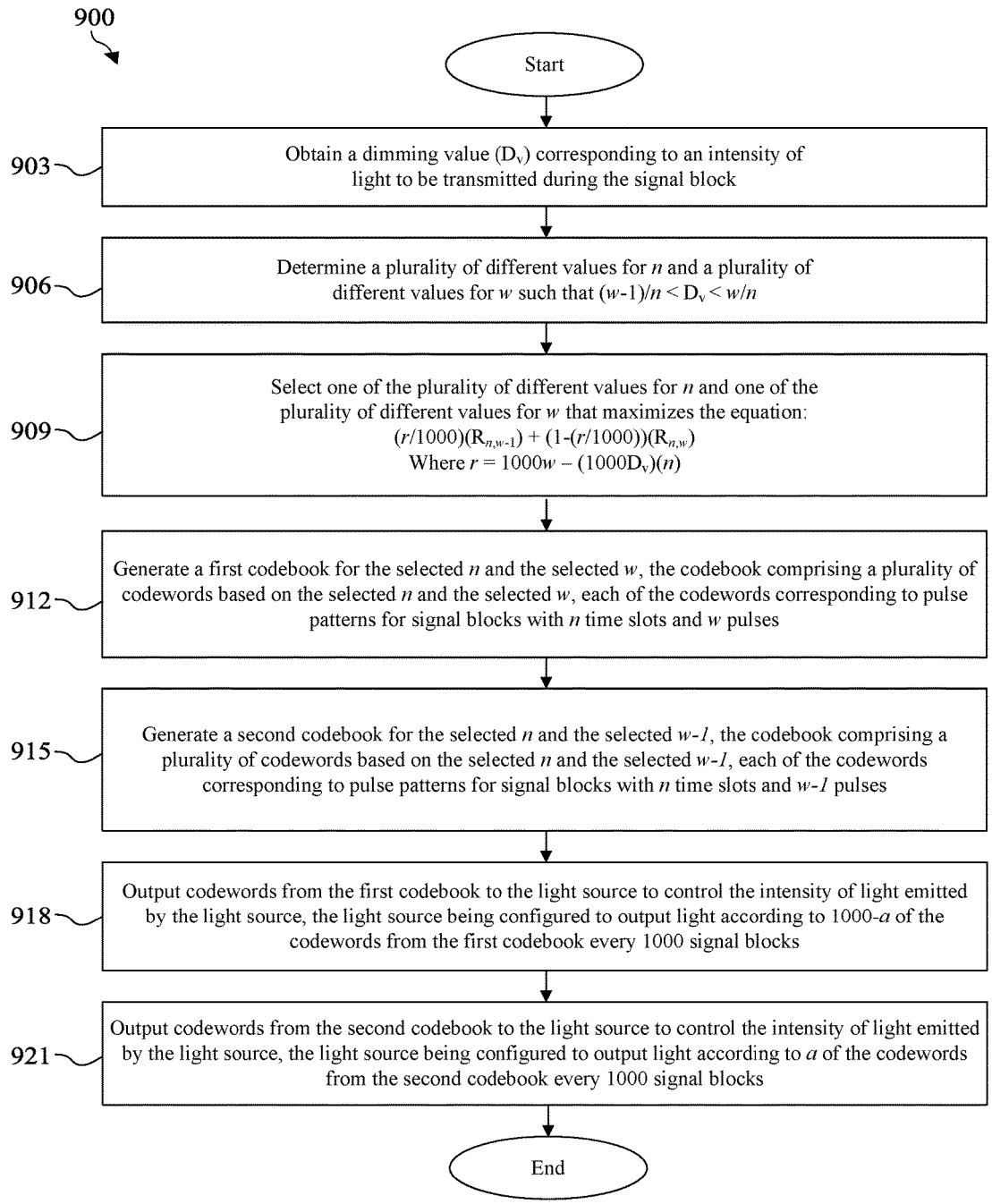
FIG. 9 is a flowchart illustrating a method of a fine dimming control method according to an embodiment of the disclosure.

FIGS. 7-9—Methods of Dimming Control

The methods of dimming control as disclosed herein achieve a desired light intensity and maximize data transmission based on the dimming value and the normalized transmission rate of signal blocks having n time slots and w pulses. FIG. 7 is a flowchart illustrating a method 700 of dimming control according to an embodiment of the disclosure. For example, the method 700 may be implemented by a VLC element 200, for example, implemented as VLC device 104. In an embodiment, the method 700 may be implemented by the VLC dimming module 270 when executing dimming control of a light source 102 coupled to the VLC device 104. At block 705, the number of n time slots for a signal block is determined based on a dimming value to be output by the light source 102. For example, processor 230 determines the n time slots for the signal block based on the dimming value to be output by the light source.

At block 710, the number of w pulses to be transmitted during one or more of the n time slots of the signal block is determined based on the dimming value. In an embodiment, the processor 230 determines the number of w pulses to be transmitted during one or more of the n time slots of the signal block. The pulse is a current pulse prepared by ON/OFF-modulating using a transistor switch, for example, disposed in VLC device 104. The pulse results in a current generated by a constant current source, for example, disposed in VLC device 104. The current is applied to a load or pin of the light source 102. The w pulses are generated when modulating the current to be ON at each of the positions of the w pulses of the n time slots. In an embodiment, the VLC device 104 comprises a switch circuit that is configured to draw current from an energy storage device to generate a signal block having n time slots and w pulses sent during one or more of the n time slots. In an embodiment, the energy storage device may be disposed in the VLC device 104. At block 715, a codeword is determined based on n and w for the dimming value. In an embodiment, the processor 230 determines the codeword based on n and w for the dimming value.

A method for coarse dimming control, as will be further described in FIG. 8, includes generating codebooks for a specified dimming value ($D_v$), where $D_v \approx w/n$ and $0<D_v<1$. In this embodiment for coarse dimming control, a pair of n and w with the highest normalized transmission rate is determined, where the ratio of w/n is approximately equal to dimming value. The pair of n and w with the highest normalized transmission rate may be determined using equation (2) and/or Table 5. Once the pair of n and w has been determined, a plurality of codewords are determined for the dimming value based on the n and w. In an embodiment, only a subset of the maximum possible codewords for the pair of n and w is selectively stored at the VLC device 104 and UE 110. In an embodiment, the number of codewords (C) that are to be included in the codebook for the determined n, w, and dimming value is determined according to equation (4):

$$C = 2^{nR_{n,w}} \qquad (4)$$

where $R_{n,w}$ is the normalized transmission rate for a given n and w according to equation (2). In the embodiment for coarse dimming control, the codebook for the determined n, w, and dimming value comprises codewords based on a Hamming distance between each of the codewords. The coarse dimming control method will be further discussed below in method 800.

A method for fine dimming control, as will be further described in FIG. 9, includes generating at least two codebooks are generated for a dimming value ($D_v$), where $0<D_v<1$, and $(w-1)/n<D_v<w/n$. In this embodiment for fine dimming control, a pair of n and w is determined that satisfies $(w-1)/n<D_v<w/n$ and maximizes equation (5):

$$\frac{r}{1000}R_{n,w-1} + \left(1 - \frac{r}{1000}\right)R_{n,w} \qquad (5)$$

where $R_{n,w-1}$ is the normalized transmission rate for a given n and w−1 according to equation (2), $R_{n,w}$ is the normalized transmission rate for a given n and w according to equation (2), and r=1000w−(1000D$_v$)n. Once the pair of n and w have been determined, two codebooks are determined for two different w's. The first codebook is determined for n and w−1. The second codebook is determined for n and w. Similar to the coarse dimming control mechanism, only a subset of the maximum possible codewords for the pair of n and w/w−1 is selectively stored at the VLC device 104. Therefore, the two codebooks include the number of codewords according to equation (1) as described above, and each codeword is selectively included in the codebook based on the Hamming distance between each of the codewords. The fine dimming control method will be further discussed below in method 900.

FIG. 8 is a flowchart illustrating a method 800 of a coarse dimming control method according to an embodiment of the disclosure. For example, the method 800 may be implemented by a VLC element 200, for example, implemented as VLC device 104. In an embodiment, the method 800 may be implemented by the VLC dimming module 270 when executing dimming control of a light source 102 coupled to the VLC device 104. At block 803, a dimming value (D$_v$) is obtained, where the dimming value corresponds to an intensity of light to be transmitted during a signal block. In an embodiment, the processor 230 obtains the dimming value. For example, a dimming value is a value between 0 and 1 that corresponds to the light intensity that is to be emitted by a light source 102 coupled to the VLC device 104.

The dimming value may be obtained in various ways. For example, the dimming value is obtained from an input by an operator. The VLC device 104 may further comprise a user interface by which an operator of the VLC device 104 may manually input values between 0 and 1 to be the dimming values. The dimming values input by the operator may be used to perform dimming control on the light 150 output by the light source 102 coupled to the VLC device 104.

In another embodiment, the dimming value is obtained from an external network element, such as the network element 108 of FIG. 1. For example, the network element 108 may be a remote UE that sends one or more values as dimming values to the VLC device 104. The dimming values received from the network element 108 may be used to perform dimming control on the light 150 emitted by the light source coupled to the VLC device 104.

In another embodiment, the dimming value is predetermined according to preconfigured dimming schedule. For example, the VLC device 104 stores a dimming schedule in a memory, such as memory 260, of the VLC device 104. The dimming schedule indicates what dimming value to use, for example, over the course of a given day. In an embodiment, the dimming schedule indicates how to divide the signal blocks into time slots. For example, the VLC device 104 is configured to determine the n time slots based on the predetermined dimming values in the preconfigured dimming schedule. The VLC device 104 is configured to determine the w pulses to be sent during one or more of the n time slots based on the predetermined dimming values in the preconfigured dimming schedule.

At block 806, a plurality of different values for n and a plurality of different values for w are determined such that the ratio of w/n is approximately equal to the dimming value obtained in block 803. In an embodiment, the processor 230 is configured to determine the different values for n and the different values for w. For example, suppose the dimming value is 0.767. The processor 230 may be configured to find a value for n and a value for w such the ratio of w/n is equal to 0.767 or approximately equal to 0.767 within a dimming error range. As discussed above, Table 2 shows the ratio of w/n for several different pairs of n and w. In one embodiment, the memory 260 of the VLC device 104 stores an extended version of Table 2, accounting for a wide range of n's and w's. However, Table 2 does not show a pair of n and w whereby the ratio of w/n is exactly equal to 0.767. In such a case, the VLC device 104 may be configured to check for pairs of n and w that are within a dimming error range of the desired dimming value. For example, if the dimming error range is ±0.05, the processor 230 may check for pairs of n and w that have a ratio of w/n between 0.717 and 0.817. As should be appreciated, the dimming error range may be any predetermined value by which the dimming value may be permitted to deviate from for purposes of dimming control.

The VLC device 104 may search the table for multiple pairs of n's and w's that have a ratio of w/n between 0.717 and 0.817. Based on Table 2 shown in FIG. 6, the following pairs of n's and w's have a ratio of w/n between 0.717 and 0.817: (4, 3), (5, 4), (8, 6), (9, 7), (10, 8), (11, 8), and (12, 9). For example, a signal block having 4 time slots and 3 pulses transmitted during the 4 time slots has a ratio of w/n equal to 0.7500, which is between 0.717 and 0.817. A signal block having 5 time slots and 4 pulses transmitted during the 5 time slots has a ratio of w/n equal to 0.8000, which is between 0.717 and 0.817. A signal block having 8 time slots and 6 pulses transmitted during the 8 time slots has a ratio of w/n equal to 0.7500, which is between 0.717 and 0.817. A signal block having 9 time slots and 7 pulses transmitted during the 9 time slots has a ratio of w/n equal to 0.7778, which is between 0.717 and 0.817. A signal block having 10 time slots and 8 pulses transmitted during the 10 time slots has a ratio of w/n equal to 0.8000, which is between 0.717 and 0.817. A signal block having 11 time slots and 8 pulses transmitted during the 11 time slots has a ratio of w/n equal to 0.7273, which is between 0.717 and 0.817. A signal block having 12 time slots and 9 pulses transmitted during the 12 time slots has a ratio of w/n equal to 0.7500, which is between 0.717 and 0.817. While this example uses Table 2 to determine the pair of n and w, it should be appreciated that the pair of n and w can be determined solely by calculating different ratios of w/n without the use of a stored table.

At block 809, one of the plurality of different values for n and one of the plurality of different values for w are selected such that the ratio of w/n that is approximately equal to the dimming value also has the highest normalized transmission rate. In an embodiment, the processor 230 is configured to select one of the different values for n and one of the different values for w having the highest normalized transmission rate. As discussed above, Table 1 shows the normalized transmission rate for several different pairs of n and w. In one embodiment, the memory 260 of the VLC device 104 stores an extended version of Table 1, accounting for a wide range of n's and w's. Continuing with the example above, Table 1 can be used to determine the normalized transmission rate for the pairs of n and w identified in block 806. The pair in which n=4 and w=3 has a normalized transmission rate of 0.5000. The pair in which n=5 and w=4 has a normalized transmission rate of 0.4000. The pair in which n=8 and w=6 has a normalized transmission rate of 0.5000. The pair in which n=9 and w=7 has a normalized transmission rate of 0.5556. The pair in which n=10 and w=8 has a normalized transmission rate of 0.5000. The pair in which n=11 and w=8 has a normalized transmission rate of 0.6364. The pair in which n=12 and w=9 has a normalized transmission rate of 0.5833. Therefore, the pair of n and w that has the highest normalized transmission rate occurs when n=11 and w=8. While this example uses Table 1 to determine the pair of n and w with the highest normalized transmission rate, it should be appreciated that the pair of n and w can be determined solely by calculating different normalized transmission rate using equation (2), without the use of a stored table.

In block 812, a first codeword is determined based on the selected n and the selected w. In an embodiment, the processor 230 determines the first codeword for the dimming value based on the selected n and the selected w. The first codeword corresponds to a first pulse pattern for a signal block with n time slots and w pulses. In an embodiment, the first codeword is randomly determined.

Continuing with the example, the selected n is 11 and the selected w is 8. The first codeword is a signal block having 11 equally split time slots in which 8 pulses are transmitted during the 11 time slots. For example, the 8 pulses are transmitted during the 11 time slots in the manner similar to which the 2 pulses are transmitted during the 12 time slots of the signal blocks shown in FIG. 4. For example, the first codeword may be a signal block having a randomly selected pulse pattern, represented as [1, 3, 4, 6, 7, 8, 10, 11] that corresponds to the codeword 10110111011. The first codeword may be stored in the dimming codewords 280 of the VLC device 104 and/or the UE 110 so that both the VLC device 104 and the UE 110 recognize the first codeword.

In block 815, a second codeword is determined based on the same selected n and the selected w. In an embodiment, the processor 230 determines the second codeword based on the selected n and the selected w. The second codeword corresponds to a second pulse pattern for a signal block with n time slots and w pulses, and the second codeword is different from the first codeword. In an embodiment, the second codeword has a maximum Hamming distance from the first codeword.

Continuing with the example, the selected n is 11 and the selected w is 8. The second codeword is another signal block having 11 equally split time slots in which 8 pulses are transmitted during the 11 time slots. For example, the second codeword may be a signal block having a pulse pattern, represented as [2, 5, 6, 7, 8, 9, 10, 11] that corresponds to the codeword 01001111111. The second codeword has 6 bits that are different from the first codeword. The Hamming distance between these two codewords, or the number of positions at which the corresponding symbols are different in the first codeword and the second codeword, is maximized to be 6 bits.

A third codeword may also be determined based on the selected n and the selected w. The third codeword may be a signal block having a pulse pattern, represented as [1, 2, 3, 4, 5, 9, 10, 11] that corresponds to the codeword 11111000111. The Hamming distance between the third codeword and the first codeword is also 6 bits. The Hamming distance between the third codeword and the second codeword is also 6 bits.

At block 818, a codebook may be generated for the selected n and the selected w. The processor 230 may generate the codebook for the selected n and the selected w. In an embodiment, the codebook comprises codewords for the selected n and the selected w. As described above with regard to equation (1), the selected n and the selected w will have a maximum number of codewords ($M_{max}$) possible. However, only a subset of these codewords may be added to the codebook and stored at memories of the VLC device 104 and the UE 110. The codewords that are included in the codebook are selected based on the Hamming distance between the codewords.

In this manner, multiple codewords are added to the codebook for the selected n and the selected w. In one embodiment, the number of codewords that are included in the codebook is determined according to equation (4). In an embodiment, the codewords are added to the codebook to maximize a minimum Hamming distance of the codebook and minimize a number of pairs of codewords in the codebook having the minimum Hamming distance. A minimum Hamming distance is the smallest of all the Hamming distances between each pair of codewords in the codebook. For example, assume that a codebook has 4 codewords: c1, c2, c3, and c4. Then the minimum Hamming distance of the codebook is minimum of {Hamming_distance(c1, c2), Hamming_distance(c1, c3), Hamming_distance(c1, c4), Hamming_distance(c2, c3), Hamming_distance(c2, c4), Hamming_distance(c3, c4)}, where Hamming_distance(ci, cj) denotes the Hamming_distance between codewords ci and cj.

The processor 230 is configured to determine which codewords to add to the codebook to maximize the minimum Hamming_distance between each pair of the codewords and to minimize the number of the pairs of the codewords having the minimum Hamming_distance so that a maximum of number of codewords according to equation (4) is not exceeded. The codebook is stored in the memories of the VLC device 104 and/or the UE 110. For example, the VLC device 104 comprises a processor 230 coupled to a switch that outputs the codewords to the light source 102, or sends pulses to the light source 102 according to the codewords stored in the memory 280. In an embodiment, the selected codewords modulate the light intensity of the light source 102 to convey information. In this way, the VLC device 104 performs dimming control of the light 150 that is output by the light source 102 according to the methods disclosed herein.

FIG. 9 is a flowchart illustrating a method 900 of fine dimming control according to an embodiment of the disclosure. In an embodiment, the fine dimming control method 900 is an optimization of the coarse dimming control method 800. While the coarse dimming control method 800 performs dimming control by approximating the dimming value to be roughly w/n, the fine dimming control method 900 performs dimming control by spreading the dimming value across w−1/n and w/n and generating at least two codebooks for these different ratios. The fine dimming control method 900 also implements transmission schemes similar to VPPM to enable the average dimming value over time to better match the desired dimming value. The fine dimming control method 900 may tune the dimming value output to a finer resolution by about 0.1%.

For example, the method 900 may be implemented by a VLC element 200, for example, implemented as VLC device 104. In an embodiment, the method 900 may be implemented by the VLC dimming module 270 when executing dimming control of a light source 102 coupled to the VLC device 104. At block 903, a dimming value ($D_v$) is obtained, where the dimming value corresponds to an intensity of light to be transmitted during a signal block. In an embodiment, the processor 230 obtains the dimming value. The dimming value is between 0 and 1. Block 903 is otherwise similar to block 803 of method 800 in FIG. 8.

At block 906, a plurality of different values for n and a plurality of different values for w are determined that satisfy the inequality equation (6):

$$\frac{w-1}{n} < L < \frac{w}{n} \quad (6)$$

In an embodiment, the processor 230 is configured to determine the different values for n and the different values for w. In contrast to the coarse dimming control method 800, that only determines n's and w's that have a ratio of w/n that is approximately equal to the dimming value, the fine dimming control method 900 considers a wider range of possible n's and w's because the fine dimming control method 900 looks at all n's and w's that are between the ratio of (w−1)/n and w/n. Similar to block 806 in method 800, pairs of n's and w's that have a dimming value between (w−1)/n and w/n are identified. These pairs may be identified using an extended Table 2 that may be stored at a memory of the VLC device 104 or may be calculated independently.

At block 909, one of the plurality of different values for n and one of the plurality of different values for w are selected that maximizes equation (5), reproduced below:

$$\frac{r}{1000} R_{n,w-1} + \left(1 - \frac{r}{1000}\right) R_{n,w} \quad (5)$$

where $R_{n,w}$ is the normalized transmission rate for a given n and w according to equation (2), and where r=1000w−(1000D$_v$)n. In an embodiment, the processor 230 is configured to select one of the different values for n and one of the different values for w that maximizes equation (5). Of all the pairs of n's and w's identified in block 906, the pair that maximizes the result of equation (5) is selected.

Unlike the coarse dimming control method 800 that only considers the normalized transmission rate of the pair of n and w, the fine dimming control method 900 is an average transmission rate of 1,000 signal blocks, where a subset (r) of the signal blocks is sent with a w decremented by 1, and the remaining subset (1000−r) of the signal blocks sent with w pulses. The normalized transmission rates ($R_{n,w-1}$ and $R_{n,w}$) may be determined using an extended Table 1 that may be stored at the memory of the VLC device 104 or may be calculated independently.

At block 912, a first codebook for the selected n and the selected w is generated. The first codebook comprises a plurality of codewords based on the selected n and the selected w. The codewords in the first codebook correspond to various pulse patterns for signal blocks with n time slots and w pulses transmitted during one or more of the n time slots. The generation of the first codebook in block 912 is performed similar to the steps 812, 815, and 818 of method 800. The codewords are added to the first codebook according to a Hamming distance, and the number of codewords included in the first codebook satisfies equation (4). In an embodiment, the processor 230 is configured to generate the first codebook.

In block 915, a second codebook is generated for the selected n and the w−1. The second codebook comprises a plurality of codewords based on the selected n and the w−1, and the codewords in the second codebook correspond to pulse patterns signal blocks with n time slots and w−1 pulses transmitted during one or more of the n time slots. The generation of the second codebook in block 915 is performed, similar to the steps 812, 815, and 818 of method 800, except that w−1 pulses are used instead of w pulses. The codewords are added to the second codebook to maximize the minimum Hamming distance between each pair of the codewords and to minimize the number of the pairs of the codewords having the minimum Hamming distance so that a maximum of number of codewords according to equation (4) is not exceeded. In an embodiment, the processor 230 is configured to generate the first codebook.

The first codebook with codewords having n time slots and w pulses corresponds to a dimming value that is slightly higher than the dimming value obtained in block 903. The second codebook with codewords having n time slots and w−1 pulses corresponds to a dimming value that is slightly lower than the dimming value obtained in block 903. This is because the second codebook involves the fewer pulses (w−1 pulses), and thus results in a lower light intensity than the first codebook, wherein the first codebook involves the transmission of more pulses (w pulses). The weighted combination of the first codebook and the second codebook will result in a more finely tuned dimming control of the light source 102 coupled to the VLC device 104.

At block 918, codewords from the first codebook are output to the light source 102 to control the intensity of light 150 emitted by the light source 102. In an embodiment, Tx/Rx 220 outputs codewords from the first codebook to the light source 102 to control the intensity of light 150 emitted by the light source 102. In an embodiment, a is the number of codewords, or pulse patterns, from the second codebook that is output to the light source 102. In an embodiment, the light source 102 is configured to output light according to 1000-a of the codewords from the first codebook every 1,000 signal blocks. In an embodiment, 1000-a is the number of codewords, or pulse patterns, from the first codebook that is output to the light source. During every 1,000 signal blocks, 1000-a codewords from the first codebook are output to the light source 102.

At block 921, codewords from the second codebook are output to the light source to control the intensity of light 150 emitted by the light source 102. In an embodiment, Tx/Rx 220 outputs codewords from the second codebook to the light source 102 to control the intensity of light 150 emitted by the light source 102. In an embodiment, the light source 102 is configured to output light according to a of the codewords from the second codebook every 1,000 signal blocks. During every 1,000 signal blocks, a codewords from the second codebook are output to the light source 102.

Of the 1,000 signal blocks, a of the signal blocks are transmitted according to the second codebook and 1000-a of the signal blocks are transmitted according to the first codebook. Therefore, the light intensity averaged over the 1,000 signal blocks effectively equals the obtained dimming level in block 903. A single codebook may not be capable of achieving the dimming level obtained in block 903. However, averaging two codebooks over thousands of signal blocks, as disclosed in the fine dimming control method 900, finely controls the dimming level and thus, can get much closer to the desired dimming level.

The embodiments of dimming control disclosed herein provide a significantly higher spectral efficiency than existing pulse modulation schemes. This is because the embodiments of dimming control disclosed herein generate optimized codebooks for specific pairs of n and w based on equations (4) and (5) and the Hamming distance between codewords in the codebook. In addition, the embodiments disclosed herein generate multiple optimized codebooks for specific pairs of n and w to more closely estimate how to fine transmit pulses to a light source 102 to achieve a desired dimming level.

The embodiments disclosed herein also enable a simple flicker mitigation method. According to some embodiments, flicker mitigation is enabled by keeping n and w constant throughout the signal blocks. Therefore, the embodiments disclosed herein provide flexible and high-resolution dimming control mechanisms that have a low implementation complexity.

The disclosure includes a signal block module determining n time slots for a signal block based on a dimming value, the signal block specifying a predetermined duration of time and the signal block being divided equally into n time slots, with the dimming value specifying a light intensity of light to be emitted by the light source, a pulse module determining w pulses to be transmitted during one or more of the n time slots of the signal block based on the dimming value and according to a pulse pattern indicating a position of the w pulses transmitted during the one or more of the n time slots, and a codeword module determining a codeword based on n and w, the codeword corresponding to the pulse pattern.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a visible light communication (VLC) device, comprising:
   determining, by a processor of the VLC device, a normalized transmission rate for transmitting data using a signal block having a plurality of different combinations of time slots in the signal block and pulses to be transmitted during the signal block based on a dimming value which specifies a light intensity of light to be emitted by a light source;
   determining, by the processor, n time slots for the signal block based on the dimming value and the normalized transmission rate, the signal block specifying a predetermined duration of time and the signal block being divided equally into the n time slots;
   determining, by the processor, w pulses to be transmitted during one or more of the n time slots of the signal block based on the dimming value, the normalized transmission rate, and a pulse pattern indicating a position of the w pulses transmitted during the one or more of the n time slots; and
   determining, by the processor, a codeword based on the n and the w, the codeword corresponding to the pulse pattern.

2. The method of claim 1, wherein the normalized transmission rate is an amount of data that is transmitted by a single pulse during the signal block having the n time slots and the w pulses.

3. The method of claim 1, further comprising determining, by the processor, a plurality of codewords for the dimming value based on the n and the w, wherein the plurality of codewords are determined in a manner to maximize a minimum Hamming distance between each pair of the plurality of codewords in a codebook, and wherein the plurality of codewords are determined to minimize a number of pairs of the plurality of codewords having the minimum Hamming distance.

4. The method of claim 1, wherein the dimming value is substantially to w/n.

5. The method of claim 1, wherein the dimming value is between (w−1)/n and w/n.

6. The method of claim 1, further comprising determining a first plurality of codewords and a second plurality of codewords for the dimming value, wherein the first plurality of codewords is based on the n and the w, and the second plurality of codewords being based on n and w−1.

7. The method of claim 6, wherein a first quantity (a) of the first plurality of codewords is output to the light source, wherein a second quantity (b) of the second plurality of codewords is output to the light source, and wherein the light intensity of the light source is modulated differently according to the first plurality of codewords and the second plurality of codewords to convey information.

8. The method of claim 1, wherein the intensity of the light is modulated according to the codeword to convey information using multi-pulse pulse-position modulation (MPPM).

9. A visible light communication (VLC) device, comprising:
   a memory storage comprising instructions; and
   a processor in communication with the memory, wherein the processor executes the instructions to:
      determine a normalized transmission rate for transmitting data using a signal block having a plurality of different combinations of time slots in the signal block and pulses to be transmitted during the signal block based on a dimming value which specifies a light intensity of light to be emitted by a light source;
      determine n time slots for the signal block based on the dimming value and the normalized transmission rate, the signal block specifying a predetermined duration of time and the signal block being divided equally into the n time slots;
      determine w pulses to be transmitted during one or more of the n time slots of the signal block based on the dimming value, the normalized transmission rate, and a pulse pattern indicating a position of the w pulses transmitted during the one or more of the n time slots; and
      determine a codeword based on the n and the w, the codeword corresponding to the pulse pattern.

10. The VLC device of claim 9, wherein the light intensity of the light is modulated according to the codeword to convey information using multi-pulse pulse-position modulation (MPPM).

11. The VLC device of claim 9, wherein the normalized transmission rate is an amount of data that is transmitted by a single pulse during the signal block having the n time slots and the w pulses.

12. The VLC device of claim 9, wherein the processor is further configured to obtain the dimming level from a user interface or an external device.

13. The VLC device of claim 9, wherein the processor is further configured to determine a plurality of codewords for the dimming value based on then and the w, wherein the plurality of codewords are determined in a manner to maximize a minimum Hamming distance between each pair of the plurality of codewords in a codebook, and wherein the plurality of codewords are determined to minimize a number of pairs of the plurality of codewords having the minimum Hamming distance.

14. A non-transitory computer-readable storage medium having computer-executable instructions that, when executed by a processor, perform the steps of:
- determine a normalized transmission rate for transmitting data using a signal block having a plurality of different combinations of time slots in the signal block and pulses to be transmitted during the signal block based on a dimming value which specifies a light intensity of light to be emitted by a light source;
- determine n time slots for the signal block based on the dimming value and the normalized transmission rate, the signal block specifying a predetermined duration of time and the signal block being divided equally into then time slots;
- determine w pulses to be transmitted during one or more of the n time slots of the signal block based on the dimming value, the normalized transmission rate, and a pulse pattern indicating a position of the w pulses transmitted during one or more of the n time slots; and
- determine a codeword based on the n and the w, the codeword corresponding to the pulse pattern.

15. The computer-readable storage medium of claim 14, wherein the normalized transmission rate is an amount of data that is transmitted by a single pulse during the signal block having the n time slots and the w pulses.

16. The computer-readable storage medium of claim 14, wherein the computer-executable instructions, when executed by the processor, further determine a plurality of codewords for the dimming value based on the n and the w, wherein the plurality of codewords are determined in a manner to maximize a minimum Hamming distance between each pair of the plurality of codewords in a codebook, and wherein the plurality of codewords are determined to minimize a number of pairs of the plurality of codewords having the minimum Hamming distance.

17. The computer-readable storage medium of claim 14, wherein the dimming value is substantially w/n.

18. The computer-readable storage medium of claim 14, wherein the dimming value is between (w−1)/n and w/n.

19. The computer-readable storage medium of claim 14, wherein the computer-executable instructions, when executed by the processor, further cause the processor to obtain the dimming level from a user interface or an external device.

20. The computer-readable storage medium of claim 14, wherein the light intensity of the light source is modulated according to the codeword to convey information using multi-pulse pulse-position modulation (MPPM).

* * * * *

UNITED STATES PATENT AND TRADEMARK OFFICE
CERTIFICATE OF CORRECTION

PATENT NO. : 10,298,333 B2
APPLICATION NO. : 15/691915
DATED : May 21, 2019
INVENTOR(S) : Dong Wei et al.

Page 1 of 1

It is certified that error appears in the above-identified patent and that said Letters Patent is hereby corrected as shown below:

In the Claims

Column 21, Claims 13 and 14, Lines 8-33, through Column 22, Lines 1-4, should read:
13. The VLC device of claim 9, wherein the processor is further configured to determine a plurality of codewords for the dimming value based on the n and the w, wherein the plurality of codewords are determined in a manner to maximize a minimum Hamming distance between each pair of the plurality of codewords in a codebook, and wherein the plurality of codewords are determined to minimize a number of pairs of the plurality of codewords having the minimum Hamming distance.

14. A non-transitory computer-readable storage medium having computer-executable instructions that, when executed by a processor, perform the steps of:
    determine a normalized transmission rate for transmitting data using a signal block having a plurality of different combinations of time slots in the signal block and pulses to be transmitted during the signal block based on a dimming value which specifies a light intensity of light to be emitted by a light source;
    determine n time slots for the signal block based on the dimming value and the normalized transmission rate, the signal block specifying a predetermined duration of time and the signal block being divided equally into the n time slots;
    determine w pulses to be transmitted during one or more of the n time slots of the signal block based on the dimming value, the normalized transmission rate, and a pulse pattern indicating a position of the w pulses transmitted during one or more of the n time slots; and
    determine a codeword based on the n and the w, the codeword corresponding to the pulse pattern.

Signed and Sealed this
Sixteenth Day of July, 2019

Andrei Iancu
*Director of the United States Patent and Trademark Office*